US012575490B2

(12) United States Patent
Shonk

(10) Patent No.: US 12,575,490 B2
(45) Date of Patent: Mar. 17, 2026

(54) AGRICULTURAL ROTARY DISC MOWER

(71) Applicant: CNH Industrial America LLC, New Holland, PA (US)

(72) Inventor: Jason Shonk, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 652 days.

(21) Appl. No.: 18/072,073

(22) Filed: Nov. 30, 2022

(65) Prior Publication Data

US 2024/0172585 A1 May 30, 2024

(51) Int. Cl.
  *A01D 34/73* (2006.01)
  *A01D 34/81* (2006.01)
  *A01D 101/00* (2006.01)

(52) U.S. Cl.
  CPC ............. *A01D 34/73* (2013.01); *A01D 34/81* (2013.01); *A01D 2101/00* (2013.01)

(58) Field of Classification Search
  CPC .... A01D 34/73; A01D 34/81; A01D 2101/00; A01D 34/828; A01D 34/664
  See application file for complete search history.

(56) References Cited

U.S. PATENT DOCUMENTS 1,536,514 A * 5/1925 Mehls ................... A01D 34/664
                                                56/295
4,183,196 A    1/1980 Oosterling 4,538,402 A * 9/1985 Muller ................. A01D 34/664
                                                56/13.6
6,510,681 B2    1/2003 Yang et al.
7,124,567 B1   10/2006 Adamson et al.
8,020,363 B1    9/2011 Barnett et al.
9,717,175 B2 * 8/2017 Fay, II ................. A01D 34/665
              (Continued)

FOREIGN PATENT DOCUMENTS

DE        6601636 U    3/1969
DE        1809273 A1   9/1970
EP        0172160 A1   2/1986
              (Continued)

OTHER PUBLICATIONS

Translation of Document EP 3578029 A1 as retrieved on Jul. 24, 2025 (Year: 2019).*
              (Continued)

*Primary Examiner* — Joseph M Rocca
*Assistant Examiner* — Jose Antonio Martinez
(74) *Attorney, Agent, or Firm* — Buchanan Ingersoll & Rooney PC

(57) ABSTRACT

An agricultural machine system includes: an agricultural work vehicle; an agricultural work machine coupled with the agricultural work vehicle and configured for mowing a crop material, the agricultural work machine including: a frame; a plurality of rotary discs coupled with the frame and including a first rotary disc and a second rotary disc, the plurality of rotary discs each including a rotational axis; a rock guard apparatus coupled with the frame and positioned below the plurality of rotary discs; and at least one knife configured for cutting the crop material, the at least one knife being coupled with the frame and positioned between the rotational axis of the first rotary disc and the rotational axis of the second rotary disc.

20 Claims, 6 Drawing Sheets

(56)         References Cited

U.S. PATENT DOCUMENTS

2017/0006773 A1 * 1/2017 Stephenson ............ A01D 34/53
2021/0015032 A1 * 1/2021 Murray ................ A01D 34/008

FOREIGN PATENT DOCUMENTS

EP            2939515  A1    11/2015
EP            3578029  A1 * 12/2019   .......... A01D 34/733
GB            736982   A     9/1955
HU            213000   B  * 1/1997   ............ A01D 34/73

OTHER PUBLICATIONS

Translation of Document HU 213000 B as retrieved on Jul. 24, 2025
(Year: 1997).*
Extended European Search Report for EP Patent Application 23213166.4
dated Apr. 25, 2024 (9 pages).

\* cited by examiner

AGRICULTURAL ROTARY DISC MOWER

FIELD OF THE INVENTION

The present invention pertains to agricultural machine systems, and, more specifically, to mower machines.

BACKGROUND OF THE INVENTION

Generally speaking, forage (which can also be referred to herein as crop, crop material, forage crop, forage material, or forage crop material) is plant material that can be harvested and provided to livestock or other animals as fodder, including but not limited to cattle, sheep, goats, and horses, during, for example, the winter or at other times when pasture land has inadequate amounts of vegetation for livestock or other animals. Depending upon the processing of the forage, forage can be formed into hay or silage. Both hay and silage can be made from grass and legumes (or mixtures thereof), and silage can also be made from, for example, corn or wheat. Hay (whether grass hay, legume hay, or a mixture thereof) results from a process that includes planting (though the plant matter is often perennial), growing, cutting, drying, and storing. Depending upon location, grass hay can include, for example, orchard grass, timothy, fescue, brome, Bermuda grass, Kentucky bluegrass, and/or ryegrass, whereas legume hay can include, for example, alfalfa, clover, and/or birdsfoot trefoil. Silage (which can, at least in some circumstances, also be referred to as haylage) can involve causing the crop material to ferment.

Further, depending upon the desired end product with respect to the forage (i.e., hay or silage), a variety of forage processing operations can be involved, and these forage processing operations include haymaking operations and silage-making operations. Haymaking operations, for example, can include planting, cutting (which can be referred to as mowing), conditioning, tedding, raking, merging, chopping, baling, bale retrieval, transport, and/or storage, and silage-making operations can include not only planting and cutting but also chopping, baling, and/or ensiling (or at least some sort of covering). A variety of agricultural harvesting machines can be used to perform these operations. Such agricultural machines include planters, mowers, mower-conditioners, tedders, rakes, mergers, choppers, balers, and bale retrievers.

As indicated, one such agricultural harvesting machine is a mower-conditioner machine (which can also be referred to as a mower-conditioner). Such mower-conditioner machines can be formed as a header attachment to a self-propelled windrower (SPW), or, alternatively, a pull-type mower-conditioner coupled with a tractor. Farmers may operate such mower-conditioners to cut any sort of crop material (hay crop, wheat, etc.) from a field, to immediately condition the crop material, and to deposit the cut crop into swaths or windrows on the field. The cutting can be performed by a cutting mechanism of the mower-conditioner, the cutting mechanism (which can also be referred to as a cutter bar) being, for example, a series of rotary discs (which can be referred to as discs or rotating discs), or a sicklebar. Such conditioning can be performed by a pair of conditioning rolls (which can be referred to collectively as the conditioner) of the mower-conditioner, a crop mat flowing therebetween, and the conditioning can break, split, bend, crush, crack, and/or crimp the crop material, as is known. After conditioning the crop material, the crop material can engage a swath gate of the mower-conditioner and, optionally, windrow shields of the mower-conditioner or the self-propelled windrower, before being deposited on the ground. The swath gate of the mower-conditioner can pivot up or down, such that when the swath gate is pivoted down the crop material is deposited on the ground in a wide swath, or such that when the swath gate is pivoted up the crop material can strike windrow shields and thereby be deposited in narrow windrows on the ground. Alternatively, the conditioning can be performed by a conditioner formed not as conditioning rolls but as flails, as is known.

Though mowers are often coupled with conditioners to form mower-conditioners as described, some mowers are not coupled with conditioners. Nevertheless, such mowers can be as described above, for example, having cutting mechanisms with a series of rotary discs or a sicklebar, and can be pushed along as a header attached to an SPW or pulled along as an implement attached to a tractor.

Whether as part of a mower-conditioner or not and regardless as to whether formed as a header or as an implement pulled along by a tractor, agricultural rotary disc mowers include a cutting mechanism including the series of rotary discs and a rock guard. Each rotary disc includes at least one blade, typically two such blades which oppose one another. The rock guard is positioned below the rotary discs and includes a shear bar which cooperates with the blades to shear at least some of the crop material. The cut quality of such rotary disc mowers, for example, is dependent upon several factors which include but are not necessarily limited to the following: crop condition (mass, lodging); forward speed; disc speed; blade sharpness; blade angle; and shear bar. Currently used shear bars have a smooth, hardened surface (though different profiles can be employed) so as to be durable in close interactions with the crop material, the ground, and foreign objects (i.e., rocks or metal). In large stem grass varieties or in heavy volume crop conditions, the cut quality is less sensitive, normally able to shear the crop material against the smooth, hardened surface of the shear bar for a clean cut. In small stem grass varieties or in light volume crop conditions, the cut quality is more sensitive, and a poor quality cut of the crop material can be noticed by the operator in areas where the rotary discs converge the flow of crop material on the cutting mechanism.

What is needed in the art is an effective way for rotary disc mowers to cut crop material in those areas where the rotary discs converge the flow of crop material, during less optimal cutting conditions.

SUMMARY OF THE INVENTION

The present invention provides an agricultural machine system including a rotary disc mower which includes at least one knife positioned substantially between adjacent rotary discs.

The invention in one form is directed to an agricultural machine system, including: an agricultural work vehicle; an agricultural work machine coupled with the agricultural work vehicle and configured for mowing a crop material, the agricultural work machine including: a frame; a plurality of rotary discs coupled with the frame and including a first rotary disc and a second rotary disc, the plurality of rotary discs each including a rotational axis; a rock guard apparatus coupled with the frame and positioned below the plurality of rotary discs; and at least one knife configured for cutting the crop material, the at least one knife being coupled with the frame and positioned between the rotational axis of the first rotary disc and the rotational axis of the second rotary disc.

The invention in another form is directed to an agricultural work machine of an agricultural machine system, the agricultural machine system including an agricultural work vehicle and the agricultural work machine, the agricultural work machine being coupled with the agricultural work vehicle and configured for mowing a crop material, the agricultural work machine including: a frame; a plurality of rotary discs coupled with the frame and including a first rotary disc and a second rotary disc, the plurality of rotary discs each including a rotational axis; and a rock guard apparatus coupled with the frame and positioned below the plurality of rotary discs; and at least one knife configured for cutting the crop material, the at least one knife being coupled with the frame and positioned between the rotational axis of the first rotary disc and the rotational axis of the second rotary disc.

The invention in yet another form is directed to a method of using an agricultural machine system, the method including the steps of: providing that the agricultural machine system includes an agricultural work vehicle and an agricultural work machine coupled with the agricultural work vehicle, the agricultural work machine being configured for mowing a crop material and including a frame, a plurality of rotary discs, and a rock guard apparatus, the plurality of rotary discs being coupled with the frame and including a first rotary disc and a second rotary disc, the plurality of rotary discs each including a rotational axis, the rock guard apparatus being coupled with the frame and positioned below the plurality of rotary discs; and coupling at least one knife with the frame, the at least one knife being configured for cutting the crop material and positioned between the rotational axis of the first rotary disc and the rotational axis of the second rotary disc.

An advantage of the present invention is that it provides a way, namely, a pair of knives (which can be referred to as shear knives), positioned substantially between rotating discs, to cut the crop material that may otherwise remains uncut. Such knives can be positioned in a plurality of recesses across the transverse extent of the mower.

Another advantage of the present invention is that it provides that the knives can be readily replaceable. Thus, in accordance with the present invention, replaceable shear knives are added in place of a smooth shear bar. The shear knives can be a pair of standard sickle knife sections that are mounted in place of the rock guard shear bar area at a top vertical plane of rock guard segment lateral areas (converging area). The present invention thus provides serrated shear counter knives to improve cut quality or to provide an option for tough cutting conditions.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with an agricultural vehicle, an agricultural machine, and/or components thereof are usually determined with reference to the direction of forward operative travel of the agricultural vehicle and/or agricultural machine, but they should not be construed as limiting. The terms "longitudinal" and "transverse" are determined with reference to the fore-and-aft direction of the agricultural vehicle and/or agricultural machine and are equally not to be construed as limiting. The terms "downstream" and "upstream" are determined with reference to the intended direction of crop material flow during operation, with "downstream" being analogous to "rearward" and "upstream" being analogous to "forward."

Figure 1:
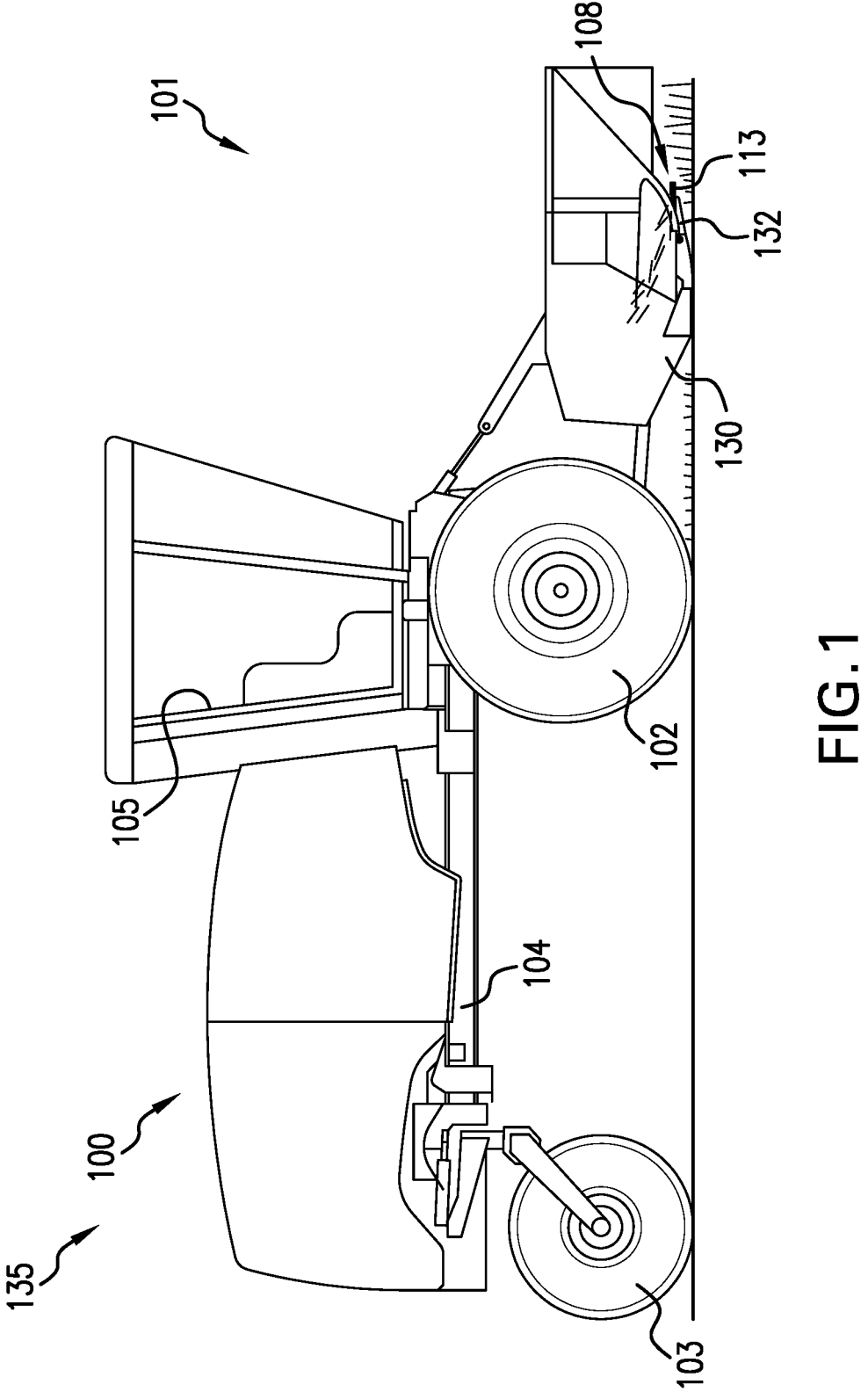
FIG. 1 illustrates schematically a side view of an exemplary embodiment of an agricultural machine system including an agricultural work vehicle, formed as a self-propelled windrower, and a mower machine, in accordance with an exemplary embodiment of the present invention.

Referring now to the drawings, and more particularly to FIG. 1, there is shown an embodiment of an agricultural machine system 135 according to the present invention, system 135 including an agricultural work vehicle 100 (which can be referred to as a work vehicle, or an agricultural vehicle) and an agricultural machine 101 (which, at least in some embodiments of the present invention, can be referred to as an agricultural header, a header, an agricultural head, a head, an agricultural implement, an implement, or an agricultural work machine), which is formed as a mower-conditioner machine 101 (which can be referred to as a mower or a mower-conditioner) and is being pushed by, and thus coupled with, agricultural work vehicle 100, agricultural machine 101 being configured for performing an agricultural operation within a field, namely, mowing and conditioning, in this embodiment of the present invention. As shown, work vehicle 100 can be configured as a self-propelled windrower (SPW). Though not shown, agricultural machine system 135 can include a control system for controlling any aspect of system 100, including mower-conditioner machine 101.

Work vehicle 100 can be an operator-driven SPW or an autonomous SPW. However, in some embodiments, work vehicle 100 may correspond to any other suitable vehicle configured to push a mower-conditioner machine across a field or that is otherwise configured to facilitate the performance of a mowing-conditioning operation, including an autonomous mower-conditioner vehicle. It should be appreciated that mower-conditioner 101, while shown as being pushed by SPW 100, may also be a self-propelled mower-conditioner that does not rely on a separate vehicle for propulsion and/or power to function. It should be further appreciated that work vehicle 100 may be configured as a tractor configured to tow mower-conditioner 101.

Work vehicle 100 includes a pair of front wheels 102, a pair of rear wheels 103, and a chassis 104 (which can also be referred to as an agricultural work vehicle frame 104 or SPW frame 104) coupled to and supported by the wheels 102, 103. An operator's cab 105 may be supported by a portion of the chassis 104 and may house various input devices for permitting an operator to control the operation of work vehicle 100 and/or mower-conditioner 101. Additionally, work vehicle 100 may include an engine and a transmission mounted on chassis 104. The transmission may be operably coupled to the engine and may provide variably adjusted gear ratios for transferring engine power to wheels 102 via a drive axle assembly. Though not shown, work vehicle 100 may be coupled to mower-conditioner 101 in part via a power take-off (PTO)(which includes a PTO shaft) and any other suitable ways, including chains, or the like. As such, work vehicle 100 may, for example, guide mower-conditioner 101 toward crop material 121 standing in the field, such that mower-conditioner 101 in FIG. 1 is a push-type mower-conditioner 101.

Mower-conditioner 101 is coupled with vehicle frame 104 and is formed as a disc header for self-propelled windrower 100 (mower-conditioner 101 can be a center pivot disc mower-conditioner, according to one exemplary embodiment of the present invention). Mower-conditioner 101 includes frame 130, cutting mechanism 108, a crop conditioner, and a pivotable swath gate (cutting mechanism 108, the crop conditioner, and the swath gate each being coupled with frame 130). Further, though not shown but as is generally known, a pair of windrow shields can be associated with mower-conditioner 101, and these windrow shields can be carried by SPW 100 or mower-conditioner 101. The conditioner (which can be, for example, a pair of conditioner rolls) and the swath gate are generally known and are thus not discussed in detail herein.

Figure 2:
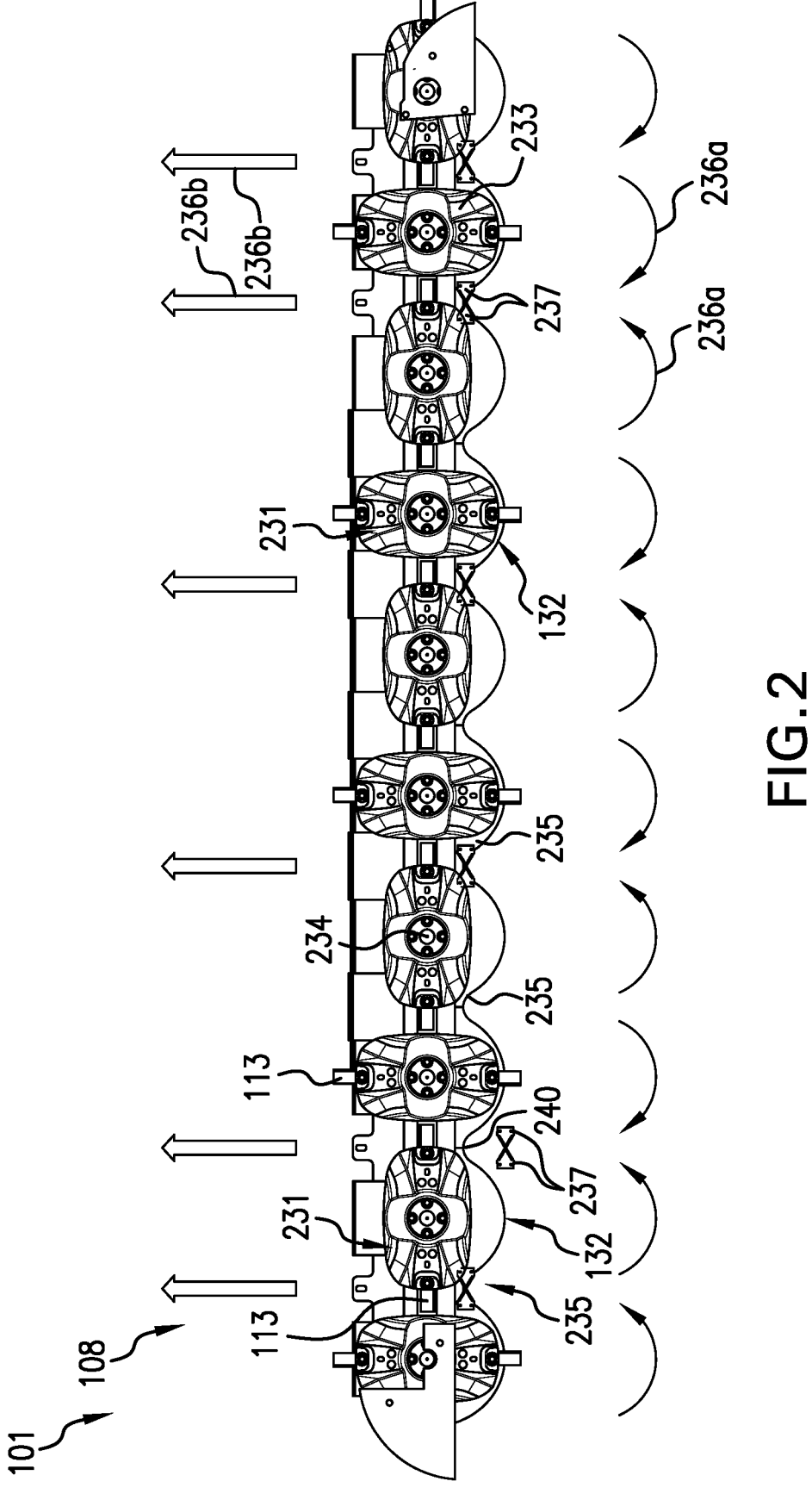
FIG. 2 illustrates schematically (partially) a top perspective view of the mower-conditioner machine of FIG. 1, with portions broken away, in accordance with an exemplary embodiment of the present invention.

Cutting mechanism 108 is configured for cutting standing crop material 121 and further conveying crop material 121 rearwardly. Cutting mechanism 108 is a rotating disc type cutting mechanism. Thus, cutting mechanism 108 includes a plurality of rotary discs 231 (FIG. 2) which are configured for rotating and thereby for severing crop material 121 (as shown in FIG. 1). Each rotary disc 231 includes at least one blade 113, typically two such blades 113 which oppose one another (FIG. 2). Blades 113 are configured for severing crop material 121 alone and/or for severing crop material 121 in cooperation with additional structure, such as at least one knife 237 (FIG. 2). Cutting mechanism 108 further includes rock guard apparatus 132 (which can also be referred to as a rock guard), which is positioned generally below rotary discs 231 and is configured for engaging the ground so as to protect rotary discs 231 and/or for otherwise shielding rotary discs 231 from the ground, rocks, and/or other foreign objects. Rotary discs 231 and rock guard apparatus 132 are coupled with frame 130.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of mower-conditioner 101 described above and shown in FIG. 1 is provided only as one example. Thus, it should be appreciated that the present disclosure may be readily adaptable to any manner of mower-conditioner configuration, or other agricultural machines, such as a vehicle and/or implement.

Further, SPW 100 and mower-conditioner 101 are provided only as an exemplary embodiment of the present invention. Let it be understood that agricultural work vehicle 100 can be any suitable type of agricultural work vehicle configured for pushing or pulling agricultural machine 100, and agricultural work vehicle 100 in FIG. 1 thus represents any such suitable agricultural work vehicle. Thus, for example, agricultural work vehicle 100 can be formed as a tractor. Further, let it be understood that agricultural machine 100 can be any suitable type of agricultural machine that is configured for mowing crop material 121 and thus has a mower, and agricultural machine 101 in FIG. 1 thus represents any such suitable agricultural machine. Thus, agricultural machine 100 need not have a conditioner and thus need not be a mower-conditioner, but can simply be a mower. Thus, agricultural machine 101 can be formed as a header or as an implement that is pulled behind and/or to the side of agricultural work vehicle 100 (i.e., a pull-type mower, a center pivot disc mower).

Referring now to FIG. 2, there is shown a top view of cutting mechanism 108 of mower-conditioner 101. Cutting mechanism 108 extends transversely across mower-conditioner 101 and includes rotary discs 231 and rock guard 132. Each rotary disc 231 includes a base 233 and two opposing blades 113 connected to base 233, as well as a rotational axis 234 about which rotary disc 231 is configured to rotate. Rock guard 132 is positioned below rotary discs 231. Rock guard 132 can include a plurality of rock guard segments positioned side-by-side so as to extend transversely across the width (or at least substantially so) of cutting mechanism 108. Rock guard 132 includes (or otherwise defines) a plurality of recessed regions 235, which can be formed at lateral ends of adjacent ones of the rock guard segments. Recessed regions 235 are the location of conventional shear bars which cooperate with blades 113 to shear crop material 121 (such a shear bar is visible in each recessed region 235 in FIG. 2 that does not receive crop flow, for example, the third recessed region 235 from the left in FIG. 2). However, in accordance with the present invention, one or more knives 237 are attached to rock guard 132 in a respective recessed region 235 in addition to or in the alternative to (that is, by replacing) the shear bar (as explained further below). The flow of crop material 121 is shown by arrows 236a, 236b. Arrows 236a show the flow of crop material 121 as crop material 121 is being moved into a particular recessed region 235. Thus, each arrow 236a also shows the direction of the respective rotary disc 131 about the respective rotational axis 234, the respective arrow 236a being positioned adjacent to and immediately upstream of the corresponding rotary disc 231. Arrows 236b show the flow of crop material 121 after crop material 121 has moved through the particular recessed region 235 and thus has already been cut. Thus, certain ones of recessed regions 235 are configured for receiving crop material 121 in cooperation with at least one rotary disc 231 (such as the first and ninth recessed regions 235 from the left in FIG. 1) or adjacent ones of counter-rotating rotary discs 231 (such as the second, fourth, sixth, and eighth recessed regions 235 from the left in FIG. 1).

Further, as indicated, cutting mechanism 108 of mower-conditioner machine 101 further includes at least one knife 237, twelve such knives 237 being shown in FIG. 2, in six pairs of knives 237. Knives 237 are shown schematically in FIG. 2. Each knife 237 (which can be called a shear knife 237) is coupled with frame 130. Further, each knife 237 is configured for cutting crop material 121 and can include at least one serrated edge configured for facilitating the cutting ability of the respective knife 237. Further, each knife 237 is positioned between the respective rotational axis 234 of adjacent rotary discs 231. Two knives 237 in FIG. 2 are shown exploded from their respective recessed region 235, for illustrative purposes. This particular recessed region 235 is shown to include the conventional shear bar 240, which is not necessarily operative in light of the addition of knifes 237 in the respective recessed region 235; alternatively, in another embodiment of the present invention, this shear bar 240 can be omitted, and knives 237 can be positioned in place of (so as to replace) this shear bar 240. According to this latter embodiment of the present invention, knives 237 are included as part of cutting mechanism 108 in place of smooth shear bar 240. Knives 237 can be a pair of standard sickle knife sections that are mounted in place of the rock guard shear bar area 240 at a top vertical plane of lateral areas of the rock guard segments (which is in recessed region 235 and thus in the area that crop material 121 converges, which can be referred to as the converging area)(discussed further in connection with FIG. 3). Knives 237 are attached to rock guard 132, according to this embodiment of the present invention, such as by way of fasteners. Knives 237, thus, can be positioned atop rock guard 132 but also in a position so as not to interfere with rotating base 233 and blades 113 of rotary discs 231, such as below base 233 and/or blades 113. Thus, rock guard 132 can further include a sunken surface (not shown) so as to accommodate knives 237 therein and thereby to prevent knives 237 from interfering with base 233 or blades 113. Knives 237 are shown schematically in FIG. 2 as triangles.

Figure 3:
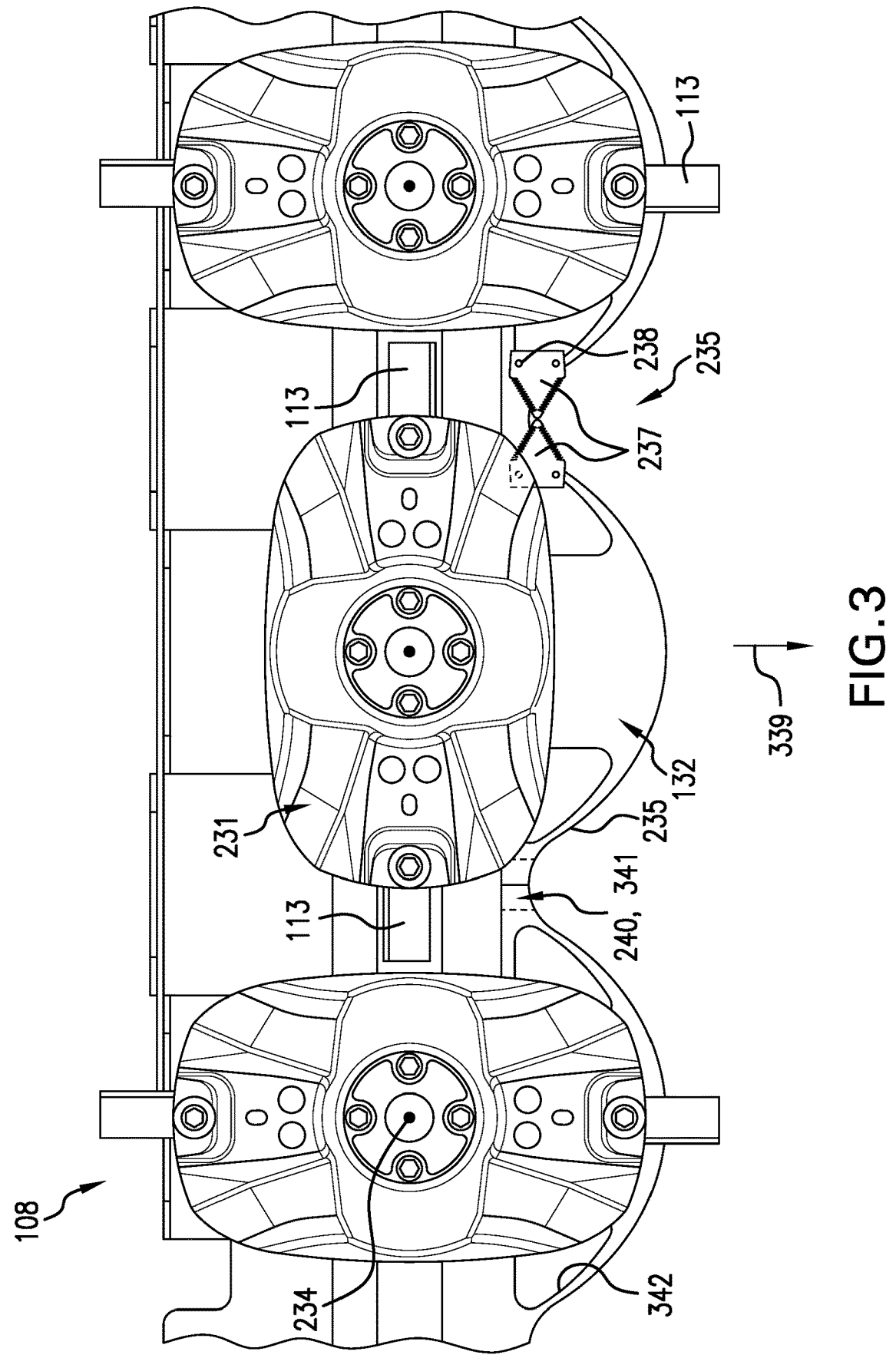
FIG. 3 illustrates schematically (partially) a top view of a cutting mechanism of the mower-conditioner machine of FIG. 2, with portions broken away, in accordance with an exemplary embodiment of the present invention.

Referring now to FIG. 3, there is shown a top view of cutting mechanism 108 of FIG. 2, with portions broken away, so as to see more closely knives 237. FIG. 3, thus, shows the third, fourth, and fifth rotary discs 231 from the left in FIG. 2. Knives 237 are shown to have serrated edges. Further, knives 237 are attached to rock guard 132, according to this embodiment of the present invention, such as by way of fasteners; for example, each knife 237 can include two fastener through-holes 338, through which corresponding fasteners extend, the fasteners then attaching to corresponding fastener receivers (such as fastener through-holes, or the like, depending upon the type of fastener used) in rock guard 132. Any suitable type of fastener can be used, such as bolts or screws. According to the embodiment of the present invention shown in FIG. 3, the respective pair of knives 237 are shown to be positioned in a respective recess region 235, and the knives 237 of the pair face one another. That is, the points of the knives 237 are directed towards one another, such that knives 237 are facing transversely and thereby perpendicular to the direction of travel 339 of vehicle 100. In this way, blades 113 (to the extent that blades 113 do not themselves cut crop material 121), direct crop material 121 in the direction of rotation of blades 113 about the respective rotational axis 234, such that crop material 121 flows into the respective recess 235. Upon reaching recess 235 and being pushed through recess 235 towards the rear, crop material 121 encounters the serrated edges of knives 237, which severs crop material 121.

Further, as discussed above, shear bar 240 (which can also be referred to as shear bar area 240) can be omitted, and knives 237 would occupy substantially the same space as shear bar area 240. In accordance with this embodiment of the present invention, material of rock guard 132 substantially corresponding to shear bar area 240 can be omitted during manufacture. This is illustrated in FIG. 3 by arrow 341 pointing to an area of material between parallel broken lines that can be omitted to make room for knives 247. Granted, this particular area in FIG. 3 is such that crop material 121 is not received there because of the rotational direction of the adjacent rotary discs 231. But, this shear bar area 240 can be identical to and thus representative of other shear bar areas 240 conventionally found in recessed regions 235. Thus, area 240 and material 341 shown in FIG. 3 is representative of the recessed regions 235 associated with the flow of crop material 121 and serves to illustrate what material can be omitted underneath knives 237.

Further, in manufacturing rock guard 132 to accommodate knives 237, a rock guard casting can be reworked to accept a sickle section (such as a sickle header section) (including one or more knives 237) on both lateral ends of the respective rock guard segment. A way (i.e., fasteners and fastener holes in knives 237 and rock guard 132) to attach the sickle sections to the rock guard segment are available for replacement (similar to a sickle knife backing plate). Further, knife 237 and/or rock guard 132 can be optimally shaped so that knife 237 can be adequately attached to rock guard 132 in light of the surrounding structures (for instance, knife 237 may be flattened, embedded in an attachment mechanism, and/or bent so as to provide for a low profile under rotary disc 231). This method of manufacturing thus employs a common part for the shear knife 237. However, it can be appreciated that a more customized configuration of knife 237 and rock guard 132 can be employed with an optimized profile. Further, rock guard apparatus 132 can optionally include a plurality of depressions 342 in the top surface of apparatus 132 (not shown in FIG. 2, for illustrative purposes).

Figure 4:
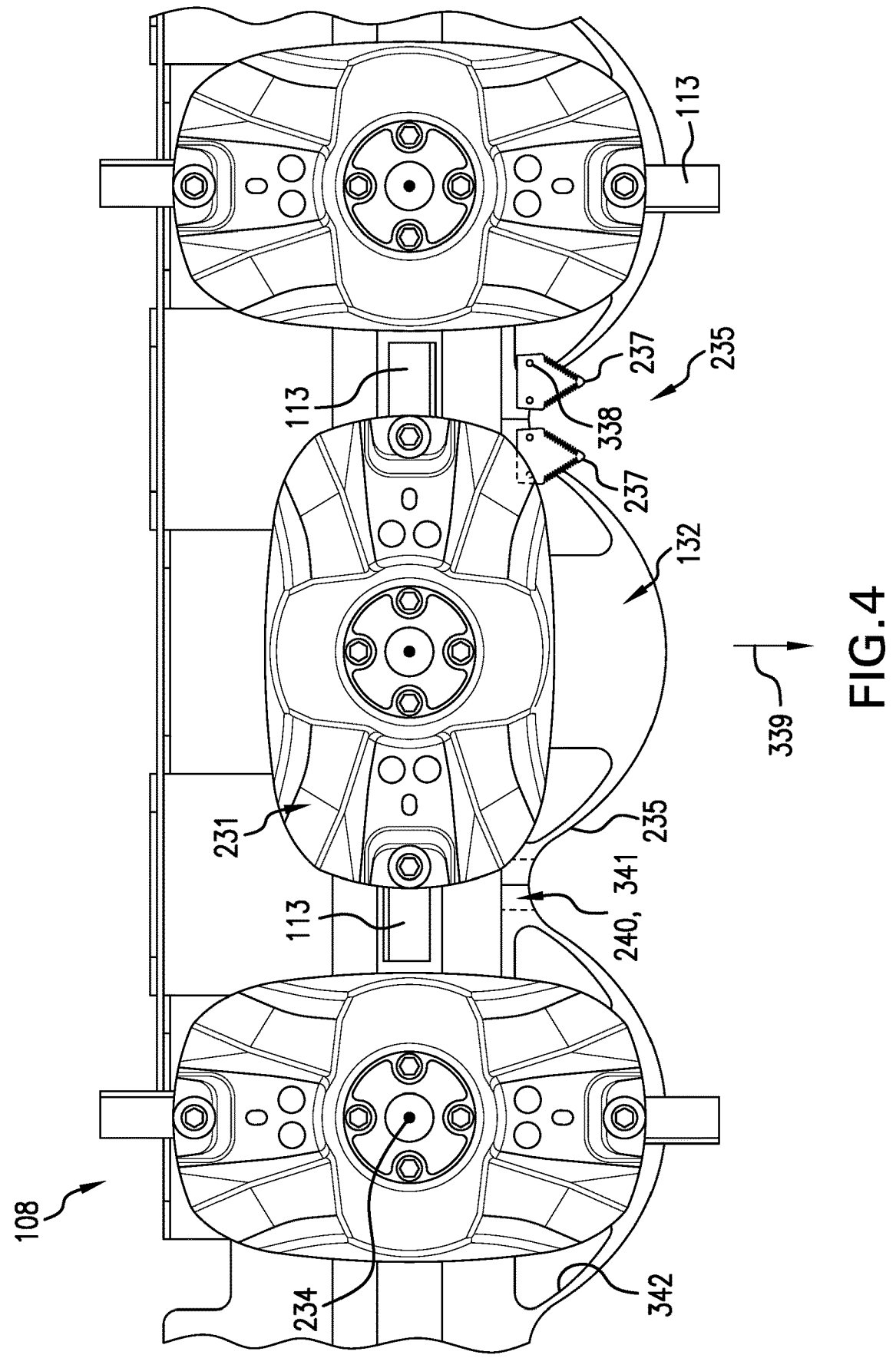
FIG. 4 illustrates schematically (partially) a top view of another embodiment of the cutting mechanism of the mower-conditioner, with portions broken away, the knives of the cutting mechanism being oriented differently relative to FIG. 3, in accordance with an exemplary embodiment of the present invention.

Referring now to FIG. 4, there is shown a top view of cutting mechanism 108, with portions broken away, so as to see more closely knives 237, in accordance with another embodiment of the present invention. The primary difference between the embodiment of FIG. 3 and that of FIG. 4 is the orientation of knives 237. Thus, FIG. 4 shows the third, fourth, and fifth rotary discs 231 from the left in FIG. 2. Knives 237 are attached to rock guard 132, according to this embodiment of the present invention, such as by way of fasteners, substantially as described above, except that the fastener receivers of rock guard 132 are in a different location than those of FIG. 3. With respect to the embodiment of the present invention shown in FIG. 4, the respective pair of knives 237 are shown to be positioned in a respective recess region 235, and the knives 237 of the pair face forward. That is, the points of the knives 237 are directed forward and thus in the direction of travel 339 of vehicle 100 and thus parallel to a longitudinal axis of machine 101. In this way, blades 113 (to the extent that blades 113 do not themselves cut crop material 121), direct crop material 121 in the direction of rotation of blades 113 about the respective rotational axis 234, such that crop material 121 flows into the respective recess 235. Upon reaching recess 235 and being pushed through recess 235 towards the rear, crop material 121 encounters the serrated edges of knives 237, which severs crop material 121. The spacing between the pair of knives 237 can be optimized by maintaining the space therebetween shown in FIG. 4, increasing the space therebetween, decreasing the space therebetween, or eliminating the space therebetween entirely. Further, because of the different orientation of knives 237 in FIG. 4 relative to FIG. 3, the shape of the material that is removed in shear bar area 240 can be different than what is shown in FIG. 3, so that knives 237 can be properly mounted.

Figure 5:
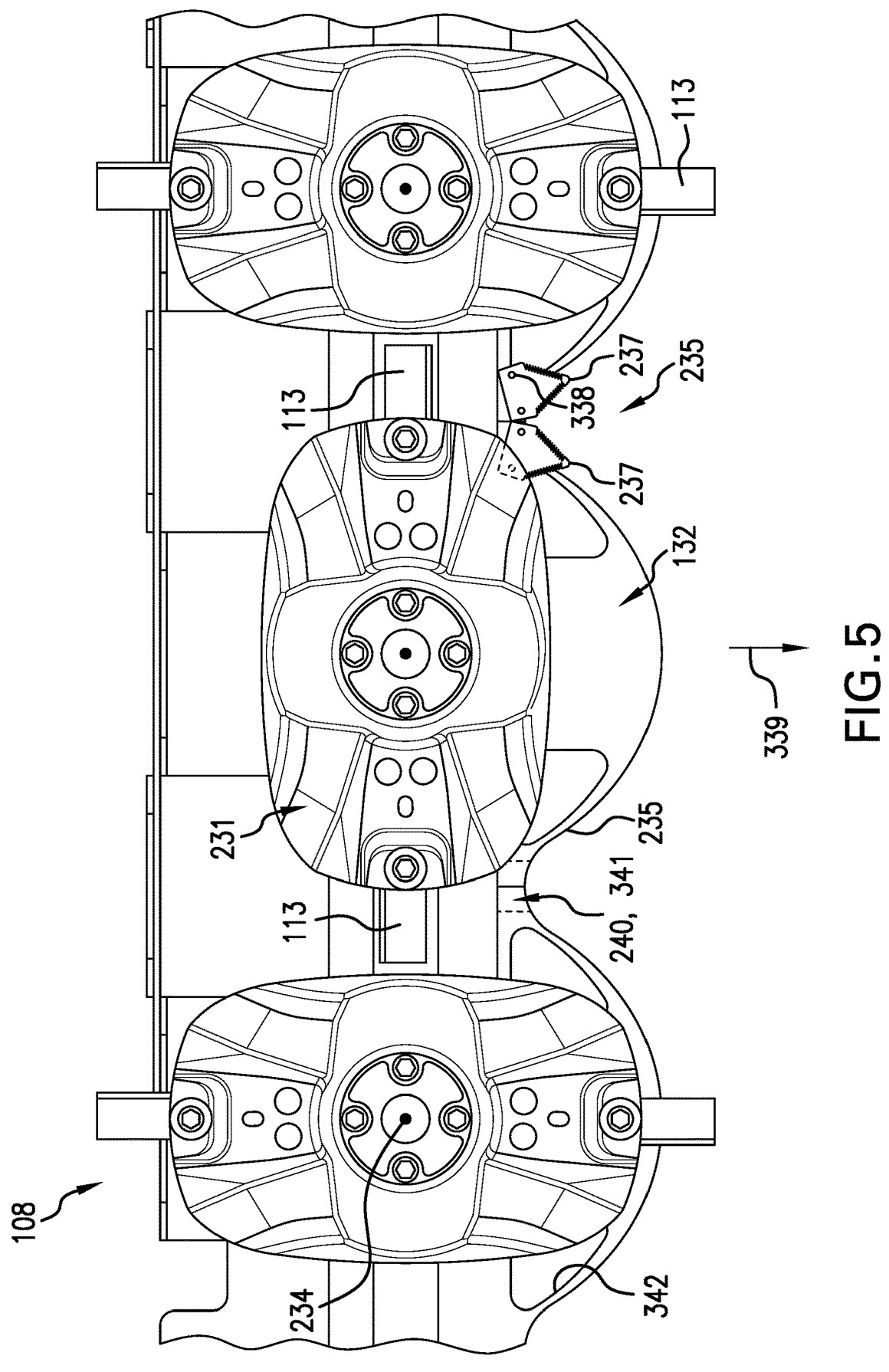
FIG. 5 illustrates schematically (partially) a top view of another embodiment of the cutting mechanism of the mower-conditioner, with portions broken away, the knives of the cutting mechanism being oriented differently relative to FIGS. 3 and 4, in accordance with an exemplary embodiment of the present invention.

Referring now to FIG. 5, there is shown a top view of cutting mechanism 108, with portions broken away, so as to see more closely knives 237, in accordance with yet another embodiment of the present invention. The primary difference between the embodiment of FIGS. 3 and 4 and that of FIG. 5 is the orientation of knives 237. Thus, FIG. 5 shows the third, fourth, and fifth rotary discs 231 from the left in FIG. 2. Knives 237 are attached to rock guard 132, according to this embodiment of the present invention, such as by way of fasteners, substantially as described above, except that the fastener receivers of rock guard 132 are in a different location than those of FIGS. 3 and 4. With respect to the embodiment of the present invention shown in FIG. 5, the respective pair of knives 237 are shown to be positioned in a respective recess region 235, and the knives 237 of the pair face away from each other, more specifically, partially away from each other. That is, the points of the knives 237 are directed partially forward in the direction of travel 339 of vehicle 100 and also partially laterally in an outboard direction (towards the lateral ends of machine 101). In this way, blades 113 (to the extent that blades 113 do not themselves cut crop material 121), direct crop material 121 in the direction of rotation of blades 113 about the respective rotational axis 234, such that crop material 121 flows into the respective recess 235. Upon reaching recess 235 and being pushed through recess 235 towards the rear, crop material 121 encounters the serrated edges of knives 237, which severs crop material 121. Further, because of the different orientation of knives 237 in FIG. 5 relative to FIGS. 3 and 4, the shape of the material that is removed in shear bar area 240 can be different than what is shown in FIGS. 3 and 4, so that knives 237 can be properly mounted.

In use, the operator of system 135 operates system 135 across a field so as to cut crop material 121. In so doing, rotary discs 231 rotate, such that blades 113 direct crop material 121 into recesses 235 so as to engage with knives 237, which severs crop material 121 from the ground, the severed crop material 121 then being directly rearwardly by blades 113 towards the rear of machine 101. Operator can change and replace knives 237 in the normal course, such as when knives 237 become broken or otherwise need servicing. Further, rock guard 132 (or any other mounting surface for knives 237) can include a plurality of holes so as to receive fasteners for fastening knives 237 to rock guard 132 or the other surface. Further, these holes can be located such that operator can select, among a plurality of options, an orientation of knives 237 relative to one another and the surrounding structure. The orientations of the knives can be any of those disclosed herein or any other orientation. Thus, the operator can select the orientation based on harvesting conditions or operator preference.

Figure 6:
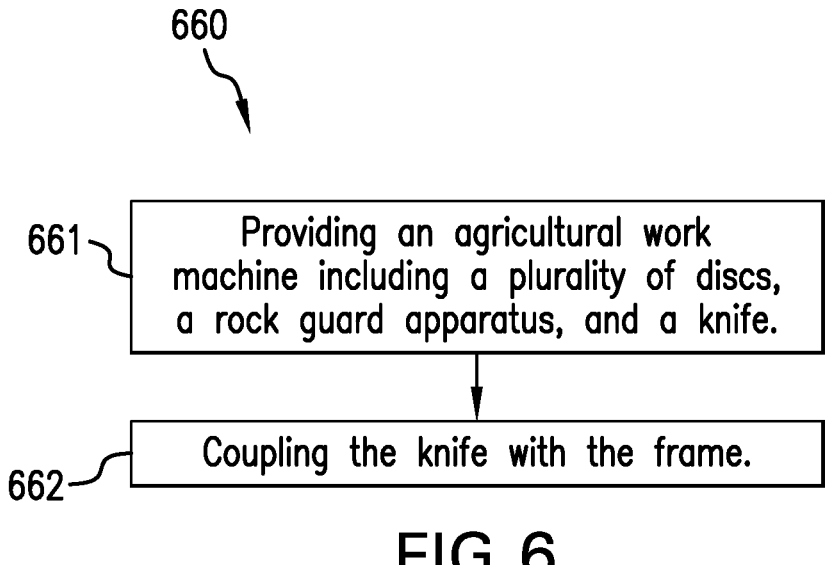
FIG. 6 illustrates a flow diagram showing a method of using an agricultural machine system, in accordance with an exemplary embodiment of the present invention.

Referring now to FIG. 6, there is shown a flow diagram showing a method 660 of using an agricultural machine system 135, the method 660 including the steps of: providing 671 that the agricultural machine system 135 includes an agricultural work vehicle 100 and an agricultural work machine 101 coupled with the agricultural work vehicle 100, the agricultural work machine 101 being configured for mowing a crop material 121 and including a frame 130, a plurality of rotary discs 231, and a rock guard apparatus 132, the plurality of rotary discs 231 being coupled with the frame 130 and including a first rotary disc 231 and a second rotary disc 231, the plurality of rotary discs 231 each including a rotational axis 234, the rock guard apparatus 132 being coupled with the frame 130 and positioned below the plurality of rotary discs 231; and coupling 672 at least one knife 237 with the frame 130, the at least one knife 237 being configured for cutting the crop material 121 and positioned between the rotational axis 234 of the first rotary disc 231 and the rotational axis 234 of the second rotary disc 231. The at least one knife 237 can be mounted to the rock guard apparatus 132, which includes at least one recessed region 235 configured for receiving the crop material 121 in cooperation with at least one of the first rotary disc 231 and the second rotary disc 231. The at least one knife 237 can include a first knife 237 and a second knife 237 each of which is positioned in the recessed region 235, the first knife 237 and the second knife 237 being positioned so as to face one another. The at least one knife 237 can include a first knife 237 and a second knife 237 each of which is positioned in the recessed region 235, the first knife 237 and the second knife 237 being positioned so as to face in a direction of travel 339 of the agricultural work vehicle. The at least one knife 237 can include a first knife 237 and a second knife 237 each of which is positioned in the recessed region 235, the first knife 237 and the second knife 237 being positioned so as to face partially away from one another.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural machine system, comprising:
an agricultural work vehicle;
an agricultural work machine coupled with the agricultural work vehicle and configured for mowing a crop material, the agricultural work machine including:
a frame;
a plurality of rotary discs coupled with the frame and including a first rotary disc and a second rotary disc, the plurality of rotary discs each including a rotational axis and a blade;
a rock guard apparatus coupled with the frame and positioned below the plurality of rotary discs; and
at least one knife having at least one serrated edge configured for cutting the crop material, the at least one knife being coupled with the frame and positioned (i) between the rotational axis of the first rotary disc and the rotational axis of the second rotary disc, (ii) at an elevation between the rock guard apparatus and the blades of the rotary discs, and (iii) atop the rock guard apparatus.

2. The agricultural machine system of claim 1, wherein the at least one knife is mounted to the rock guard apparatus, which includes at least one recessed region configured for receiving the crop material in cooperation with at least one of the first rotary disc and the second rotary disc.

3. The agricultural machine system of claim 2, wherein the at least one knife includes a first knife and a second knife each of which is positioned in the recessed region, the first knife and the second knife being positioned such that pointed ends of the first and second knives face one another.

4. The agricultural machine system of claim 2, wherein the at least one knife includes a first knife and a second knife each of which is positioned in the recessed region, the first knife and the second knife being positioned so as to face in a direction of travel of the agricultural work vehicle.

5. The agricultural machine system of claim 2, wherein the at least one knife includes a first knife and a second knife each of which is position in the recessed region, the first knife and the second knife being positioned so as to face partially away from one another.

6. An agricultural work machine of an agricultural machine system, the agricultural machine system including an agricultural work vehicle and the agricultural work machine, the agricultural work machine being coupled with the agricultural work vehicle and configured for mowing a crop material, the agricultural work machine comprising:

a frame;

a plurality of rotary discs coupled with the frame and including a first rotary disc and a second rotary disc, the plurality of rotary discs each including a rotational axis and a blade; and a rock guard apparatus coupled with the frame and positioned below the plurality of rotary discs; and at least one knife edge having at least one serrated edge configured for cutting the crop material, the at least one knife being coupled with the frame and positioned (i) between the rotational axis of the first rotary disc and the rotational axis of the second rotary discs, (ii) at an elevation between the rock apparatus and the blades of the rotary discs, and (iii) atop the rock guard apparatus.

7. The agricultural work machine of claim 6, wherein the at least one knife is mounted to the rock guard apparatus, which includes at least one recessed region configured for receiving the crop material in cooperation with at least one of the first rotary disc and the second rotary disc.

8. The agricultural work machine of claim 7, wherein the at least one knife includes a first knife and a second knife each of which is positioned in the recessed region, the first knife and the second knife being positioned such that pointed ends of the first and second knives face one another.

9. The agricultural work machine of claim 7, wherein the at least one knife includes a first knife and a second knife each of which is positioned in the recessed region, the first knife and the second knife being positioned so as to face in a direction of travel of the agricultural work vehicle.

10. The agricultural work machine of claim 7, wherein the at least one knife includes a first knife and a second knife each of which is positioned in the recessed region, the first knife and the second knife being positioned so as to face partially away from one another.

11. A method of using an agricultural machine system, the method comprising the steps of:

providing that the agricultural machine system includes an agricultural work vehicle and an agricultural work machine coupled with the agricultural work vehicle, the agricultural work machine being configured for mowing a crop material and including a frame, a plurality of rotary discs, and a rock guard apparatus, the plurality of rotary discs being coupled with the frame and including a first rotary disc and a second rotary disc, the plurality of rotary discs each including a rotational axis and a blade, the rock guard apparatus being coupled with the frame and positioned below the plurality of rotary discs; and coupling at least one knife with the frame, the at least one knife having at least one serrated edge being configured for cutting the crop material, the at least one knife being positioned (i) between the rotational axis of the first rotary disc and the rotational axis of the second rotary disc, (ii) at an elevation between the rock guard apparatus and the blades of the rotary discs, and (iii) atop the rock guard apparatus.

12. The method of claim 11, wherein the at least one knife is mounted to the rock guard apparatus, which includes at least one recessed region configured for receiving the crop material in cooperation with at least one of the first rotary disc and the second rotary disc.

13. The method of claim 12, wherein the at least one knife includes a first knife and a second knife each of which is positioned in the recessed region, the first knife and the second knife being positioned such that pointed ends of the first and second knives face one another.

14. The method of claim 12, wherein the at least one knife includes a first knife and a second knife each of which is positioned in the recessed region, the first knife and the second knife being positioned so as to face in a direction of travel of the agricultural work vehicle.

15. The method of claim 12, wherein the at least one knife includes a first knife and a second knife each of which is positioned in the recessed region, the first knife and the second knife being positioned so as to face partially away from one another.

16. The agricultural machine system of claim 1, wherein a first distance between the rotational axis of one of the plurality of rotary discs and a free end of the blade of said one of the plurality of rotary discs is greater than a second distance between the rotational axis of said one of the plurality of rotary discs and a free end of the knife closest to said one of the plurality of rotary discs.

17. The agricultural work machine of claim 6, wherein a first distance between the rotational axis of one of the plurality of rotary discs and a free end of the blade of said one of the plurality of rotary discs is greater than a second distance between the rotational axis of said one of the plurality of rotary discs and a free end of the knife closest to said one of the plurality of rotary discs.

18. The agricultural machine system of claim 1, wherein the rock guard apparatus comprises adjacent convex surfaces and a concave surface interconnecting the adjacent convex surfaces, wherein the knife is mounted over the concave surface.

19. The agricultural work machine of claim 6, wherein the rock guard apparatus comprises adjacent convex surfaces and a concave surface interconnecting the adjacent convex surfaces, wherein the knife is mounted over the concave surface.

20. The method of claim 11, wherein the rock guard apparatus comprises adjacent convex surfaces and a concave surface interconnecting the adjacent convex surfaces, wherein the knife is mounted over the concave surface.

* * * * *